United States Patent
Effenberger

(10) Patent No.: US 9,481,341 B2
(45) Date of Patent: Nov. 1, 2016

(54) SAFETY BELT ARRANGEMENT FOR A MOTOR VEHICLE

(71) Applicant: Volkswagen Aktiengesellschaft, Wolfsburg (DE)

(72) Inventor: Witali Effenberger, Wendeburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 14/438,740

(22) PCT Filed: Sep. 11, 2013

(86) PCT No.: PCT/EP2013/068793
§ 371 (c)(1),
(2) Date: Apr. 27, 2015

(87) PCT Pub. No.: WO2014/063861
PCT Pub. Date: May 1, 2014

(65) Prior Publication Data
US 2015/0291124 A1    Oct. 15, 2015

(30) Foreign Application Priority Data
Oct. 27, 2012    (DE) .......................... 10 2012 021 215

(51) Int. Cl.
| | | |
|---|---|---|
| *B60R 22/195* | (2006.01) |
| *B60N 2/005* | (2006.01) |
| *B62D 25/20* | (2006.01) |
| *B62D 29/00* | (2006.01) |
| *B60R 11/00* | (2006.01) |
| *B60R 22/18* | (2006.01) |

(52) U.S. Cl.
CPC ............ *B60R 22/1952* (2013.01); *B60N 2/005* (2013.01); *B62D 25/2009* (2013.01); *B62D 29/008* (2013.01); *B60R 2011/0029* (2013.01); *B60R 2022/1818* (2013.01)

(58) Field of Classification Search
CPC .................. B60R 22/1952; B60R 2011/0029; B60R 2022/1818; B60N 2/005; B62D 25/2009
See application file for complete search history.

(56) References Cited

U.S. PATENT DOCUMENTS

| | | | |
|---|---|---|---|
| 2002/0105181 A1 | 8/2002 | Specht et al. | |
| 2006/0082125 A1 | 4/2006 | Glinka et al. | |
| 2011/0241328 A1* | 10/2011 | Miyajima | B60R 22/24 |
| | | | 280/808 |
| 2011/0291395 A1 | 12/2011 | Moeker et al. | |
| 2012/0049501 A1* | 3/2012 | Fujii | B60R 22/023 |
| | | | 280/806 |

FOREIGN PATENT DOCUMENTS

| | | |
|---|---|---|
| DE | 101 05 500 A1 | 8/2002 |
| DE | 10 2004 041 810 A1 | 3/2006 |
| DE | 10 2008 057124 A1 | 5/2010 |
| JP | 2006 199198 A | 8/2006 |
| JP | 2009 107368 A | 5/2009 |

OTHER PUBLICATIONS

International Search Report for PCT International Application No. PCT/EP2013/068793, mailed Nov. 20, 2013.
Search Report for German Patent Application No. 10 2012 021 215.1, mailed Jul. 1, 2013.

* cited by examiner

*Primary Examiner* — Faye M Fleming
(74) *Attorney, Agent, or Firm* — Pearl Cohen Zedek Latzer Baratz LLP

(57) ABSTRACT

The invention relates to a safety belt arrangement for a motor vehicle, comprising a safety belt having a safety belt section and a pelvic belt section (6), which safety belt has a belt diverter (13) on the outer attachment point (A) in the motor vehicle transverse direction (y), above which belt diverter the pelvic belt section (6) is guided to a belt tensioner unit (19) in the region of a rocker panel (7). According to the invention the rocker panel (7) has a retaining profile part (27) which supports a door sill panel (4) delimiting the door entry area, wherein between the retaining profile part (27) and a bottom group (41) of the motor vehicle lying underneath an installation space (33) is formed, in which the belt tensioner unit (19) is arranged.

12 Claims, 4 Drawing Sheets

US 9,481,341 B2

SAFETY BELT ARRANGEMENT FOR A MOTOR VEHICLE

CROSS-REFERENCE TO RELATED APPLICATIONS

This application is a National Phase Application of PCT International Application No. PCT/EP2013/068793, International Filing Date Sep. 11, 2013, claiming priority of German Patent Application No. 10 2012 021 215.1, filed Oct. 27, 2012, which is hereby incorporated by reference in its entirety.

FIELD OF THE INVENTION

The present invention relates to a seat-belt configuration for a vehicle according to the definition of the species set forth in claim 1.

BACKGROUND OF THE INVENTION

Restraint systems at front seats in motor vehicles equipped with a three-point seat belt that include a seat-belt tensioner not only at the shoulder belt portion, but also at the anchorage point of the lap-belt portion that is outwardly disposed in the vehicle transverse direction, achieve outstanding ratings in crash tests.

A seat-belt configuration of the aforementioned type is known from the German Patent Application DE 10 2008 057 124 A1 where, at the anchorage point thereof that is outwardly disposed in the vehicle transverse direction, the lap-belt portion of the seat belt has a belt deflector via which the lap-belt portion is routed to a seat-belt tensioning device in the area of a doorsill. In the case of the double tightening known from the German Patent Application DE 10 2008 057 124 A1, a knee contact with the dashboard is avoided, particularly in the event of a collision. The seat-belt tensioner configured in the doorsill can be pyrotechnically ignitable and, in the event of a collision, take up any seat-belt slack from the lap-belt portion and thus reduce a pelvis forward displacement of the vehicle occupant, and thereby positively influence the occupant kinematics. In the German Patent Application DE 10 2008 057 124 A1, the laterally outer anchorage point of the lap-belt portion is constituted of a belt deflector in the base region of the B-pillar. In this instance, the seat-belt tensioning device is configured upstream in the vehicle longitudinal direction toward the entry area and is concealed by a trim panel, which, in the door opening area, is a sill trim strip. The sill trim strip can be directly attached to the doorsill via a profiled retaining section.

Inevitably, however, such an additional seat-belt tensioner considerably increases the space required in the doorsill region, thereby making it necessary to reduce a required free space between the doorsill and a vehicle seat in the vehicle transverse direction.

SUMMARY OF THE INVENTION

It is an object of the present invention to provide a seat-belt configuration that is compactly installed in the doorsill region of the vehicle.

The objective is achieved by the features of claim 1. Preferred embodiments of the present invention are recited in the dependent claims.

The present invention is based on the factual situation that the installation space available in the doorsill region is very constricted. Against this background, the profiled retaining section of the doorsill may not only bear the sill trim strip bounding the entry area, but has the second function of additionally delimiting an installation space which is disposed between itself and a subjacent vehicle floor assembly and within which the seat belt tensioning device is configured.

In one preferred specific embodiment, the profiled retaining section defining the seat-belt tensioner installation space may feature a first bounding wall that is inwardly spaced from the doorsill via a transverse offset and is vertically oriented. Alternatively or additionally thereto, the profiled retaining section may feature a second bounding wall that is spaced by a height offset from the subjacent floor assembly and is horizontally oriented. The two bounding walls may form an angle section that is of uniform material and in one piece, and is elongate in the vehicle longitudinal direction, where the first and second bounding walls converge at a transition edge that extends along the vehicle longitudinal direction.

The horizontal bounding wall of the profiled retaining section may be directly secured to the doorsill, while the vertical bounding wall may be attached to the floor assembly.

The doorsill may be designed as a hollow-section sheet-metal panel, and, more specifically, with an approximately shell-shaped outer sheet-metal panel that is assembled together with an inner sheet-metal panel via flange joints. The profiled retaining section according to the present invention may be fastened to the inner sheet-metal panel of the doorsill, in particular.

In the case of the seat-belt device according to the present invention, the belt deflector mentioned above may be configured in the base region of a vehicle pillar, and the lap-belt portion is guided therethrough to the seat-belt tensioning device configured in the profiled retaining section. The seat-belt tensioning device may be positioned at approximately the same height as the belt deflector and be configured upstream of the same in the vehicle longitudinal direction. The end of the lap-belt portion routed around the belt deflector may be joined at a coupling site to a tension cable that is operatively connected to the seat-belt tensioning device. It is advantageous here for the profiled retaining section to have an insertion opening that is open toward the belt deflector and though which the lap-belt portion may be brought into engagement with the seat-belt tensioning device.

The vehicle floor assembly mentioned above may have a seat base sheet-metal panel having a horizontal mounting face facing the passenger compartment. An automotive seat is installed on this mounting face. At the same time, the horizontal mounting face of the seat base panel may delimit the seat-belt tensioner installation space vertically downwardly. This enables the seat-belt tensioning device to be integrated in a sheet-metal panel configuration that is not only compact, but also exhibits exceptional structural stiffness, where a proper functioning of the seat-belt tensioner is even ensured in the event of a collision.

To achieve a simple, as well as positionally accurate assembly, the profiled retaining section may have retaining tabs on the bounding walls thereof. In the installation position of the profiled retaining section, the retaining tabs engage form-fittingly behind corresponding recesses in the doorsill and/or in the floor assembly. To secure this form-fitting connection, securing elements, for instance, threaded elements may be provided, via which at least the other fastening wall of the profiled retaining section may be bolted to the doorsill and/or to the floor assembly.

The seat base panel mentioned above may likewise be an angular profiled section where the horizontal mounting face mentioned above merges at an angle at the transition edge, which extends in the vehicle longitudinal direction, into a vertical supporting leg that is supported on a floor panel of the vehicle. The floor panel, in turn, may be outwardly configured in the vehicle transverse direction to reach directly to the doorsill and be welded to the inner sheet-metal panel of the doorsill, for example.

The profiled retaining section and the seat-belt tensioning device may be preferably assembled, already separately from the vehicle, into a preassembly unit which may then be installed in the vehicle bodyshell. Accordingly, the seat-belt tensioning device is not installed at the doorsill, but rather on the profiled retaining section and, in the post-assembly position, is spaced by a free joint gap from the doorsill, whereby assembly and manufacturing tolerances are able to be compensated.

It is also preferred that the profiled retaining section be an integral part of a lateral receiving contour for the floor lining, for instance, a carpeting of the vehicle. For this purpose, at the inner side thereof in the vehicle transverse direction, the vertical bounding wall of the profiled retaining section may feature a contact face adapted for the floor covering to be brought into contact therewith. Another component of this receiving contour may be the sill trim strip which merges inwardly in the vehicle transverse direction into a retaining segment. The retaining segment may extend around the transition edge and the vertical bounding wall of the profiled retaining section at a distance, forming an insertion groove. In the assembled state, the lateral edge of the floor covering may be placed in a concealed manner in the insertion groove that is downwardly open in the vertical vehicle direction. Thus, in such a configuration, the profiled retaining section is completely concealed by the insertion strip, as well as by the floor covering.

In addition, between the profiled retaining section, in particular the horizontal bounding wall thereof, and the sill trim strip, an installation channel may be defined that extends along the doorsill in the vehicle longitudinal direction and in which power supply lines of the vehicle may be placed, for example.

Advantageous embodiments and/or refinements of the present invention explained above and/or described in the dependent claims may be used individually or, however, also in any desired combination except, for example, in cases of unique dependencies or incompatible alternatives.

BRIEF DESCRIPTION OF THE DRAWINGS

The present invention and the advantageous embodiments and/or refinements thereof, as well as the associated advantages are clarified in greater detail in the following with reference to the drawing, in which.

DETAILED DESCRIPTION OF THE INVENTION

Figure 1:
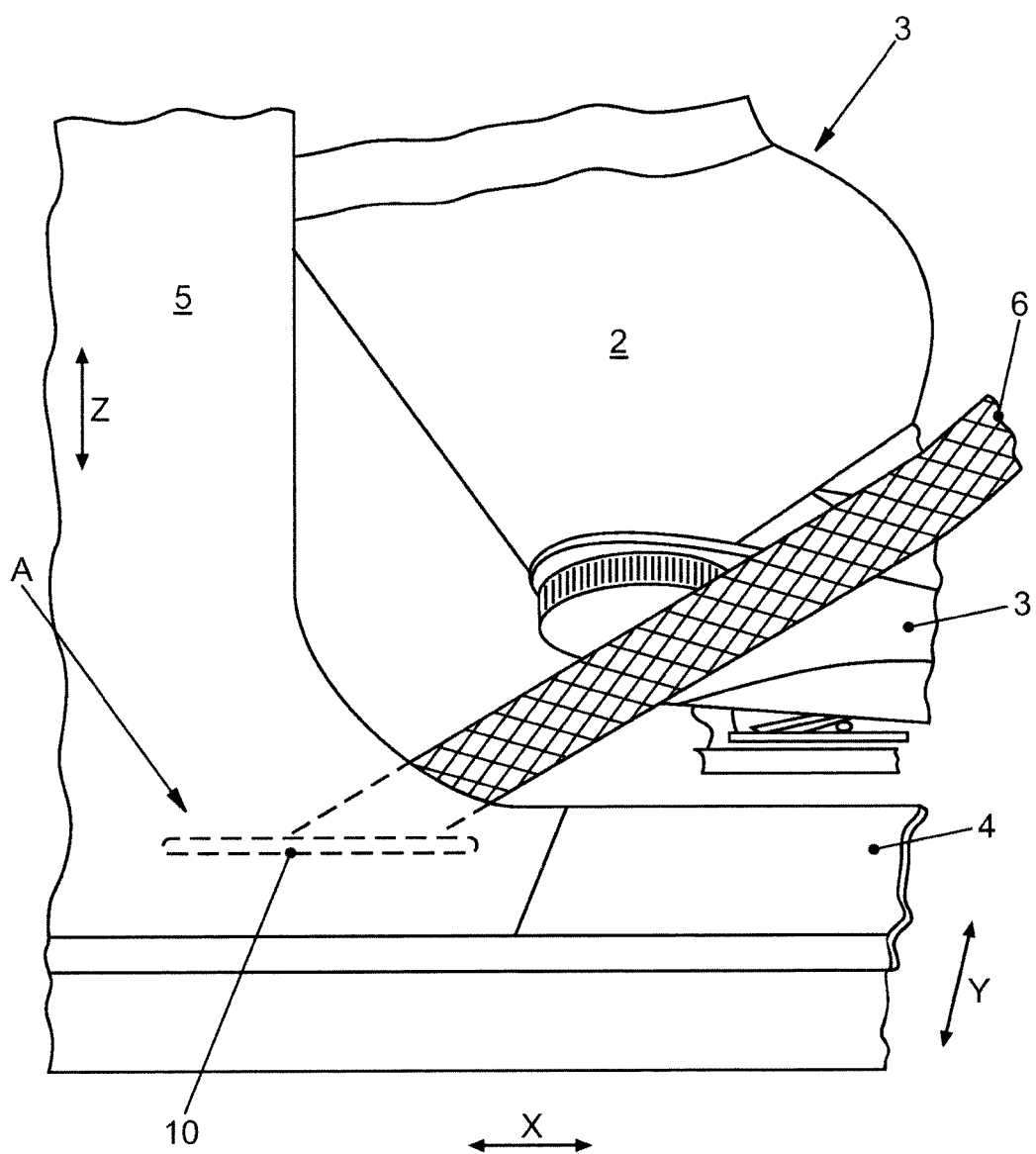
FIG. 1 shows in a partially perspective view a front seat of a four-door vehicle in the entry area, including an only partially shown lap-belt portion of a three-point seat belt.

FIG. 1 shows portions of the entry area of a four-door vehicle, for example, in the case of an open front vehicle door, and, more specifically, including an only partially illustrated front seat 1 that features a seat back 2, as well as a seat component 3.

The only partially shown entry area is downwardly delimited in vertical vehicle direction z by an approximately horizontally extending sill trim strip 4, as well as, to the rear in vehicle longitudinal direction x, by the trim panel of an approximately vertical B-pillar 5 of the vehicle body. For each front seat 1, the vehicle has a three-point seat-belt configuration which is composed in a generally known manner of a lap-belt portion 6 and a shoulder-belt portion (not shown). The shoulder-belt portion may be anchored to B-pillar 5 via a first seat-belt tensioner (not shown) approximately at the head height of a vehicle occupant seated on front seat 1. In the belted-in state illustrated in FIG. 1, lap-belt portion 6 extends from the belt latch mechanism, configured more or less in the middle of the vehicle, across the pelvic region of the vehicle occupant in vehicle transverse direction y to an outer anchorage point A on doorsill 7, belt portion 6 being passed through a guide slot 10 of the trim panel made of plastic.

Sill trim strip 4 is mounted on doorsill 7 via a later described profiled retaining section 27. In this context, doorsill 7 extends in a concealed manner underneath sill trim strip 4.

Figure 2:
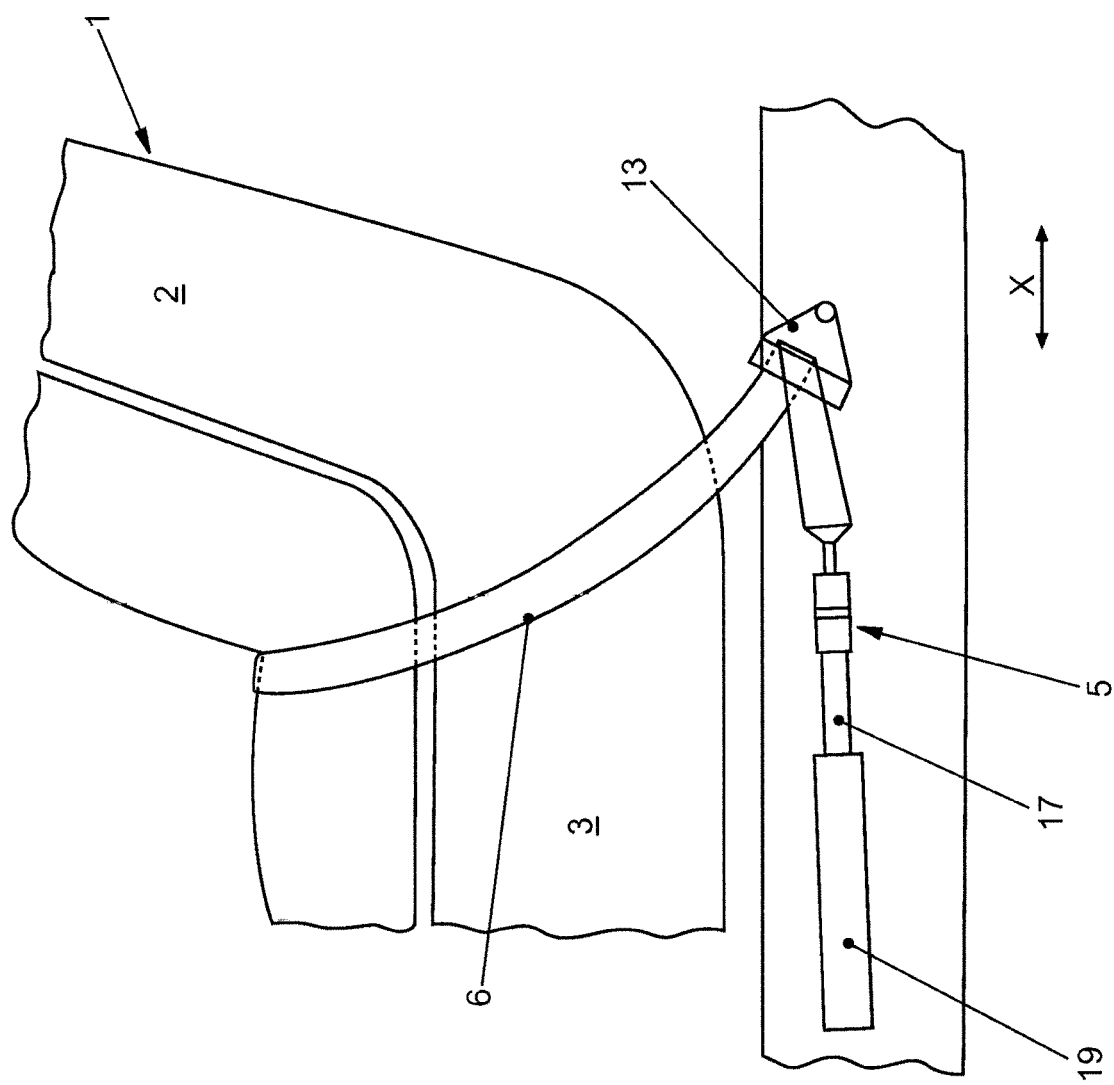
FIG. 2 shows a seat-belt tensioning device configured in the doorsill region for the lap-belt portion of the seat belt.

In a rough schematic view, FIG. 2 shows the further path of lap-belt portion 6 underneath guide slot 10. Accordingly, lap-belt portion 6 is forwardly deflected in vehicle longitudinal direction x via a belt deflector 13 that is configured in the base region of B pillar 5. The forwardly deflected end of lap-belt portion 6 is extended at a coupling site 15 by a tension cable that is operatively connected to seat-belt tensioning device 19. Seat-belt tensioning device 19 may be pyrotechnically activated in response to a collision, whereby tension cable 17 exerts a tensile force on lap-belt portion 6, tightening the same.

Figure 3:
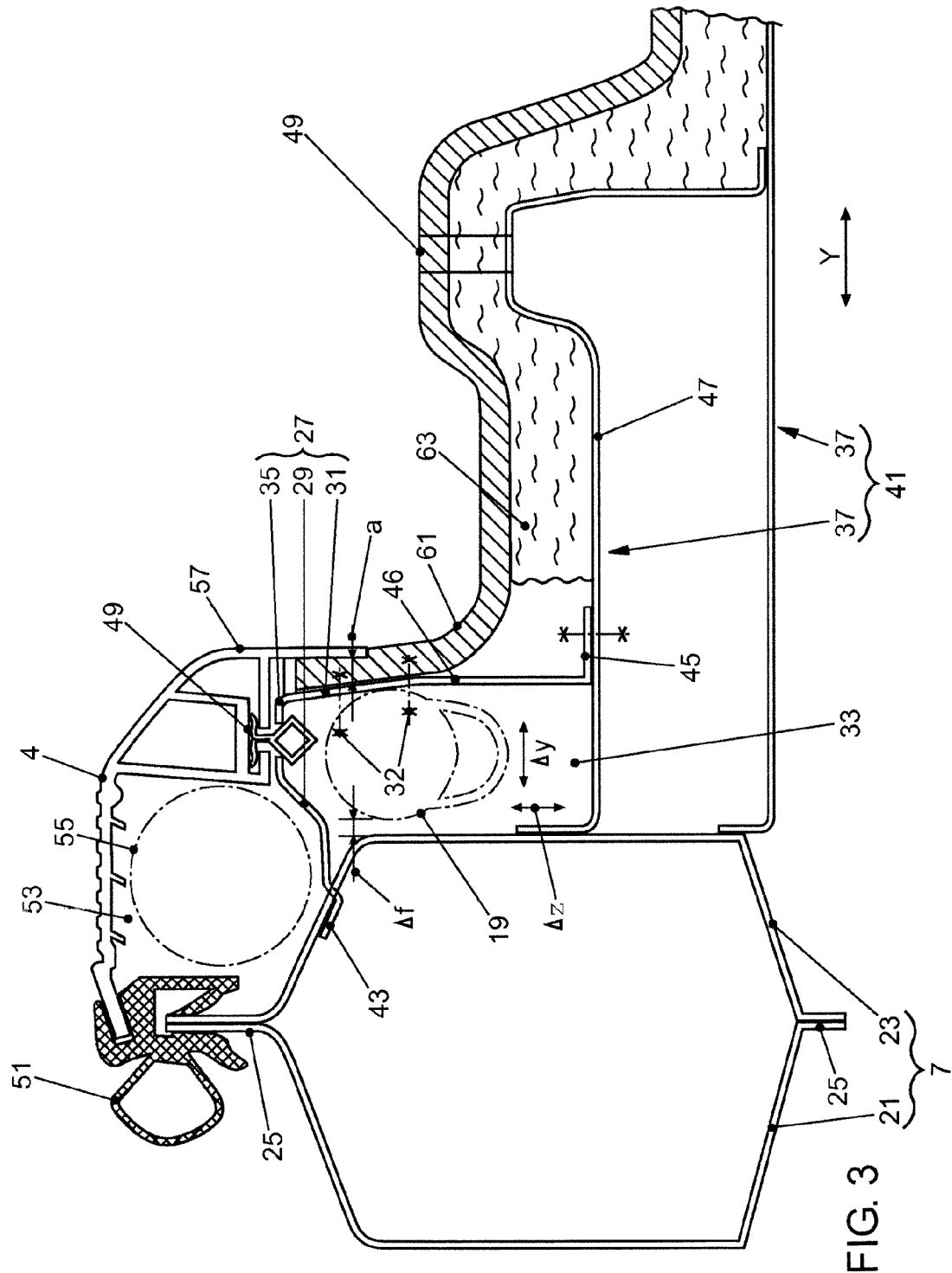
FIG. 3 shows, in a sectional representation, the doorsill region, as well as the seat-belt tensioning device in the post-assembly position; and, FIG. 4 shows, in a perspective view, the seat-belt tensioning device in the doorsill region with the sill trim strip being omitted.
Figure 4:
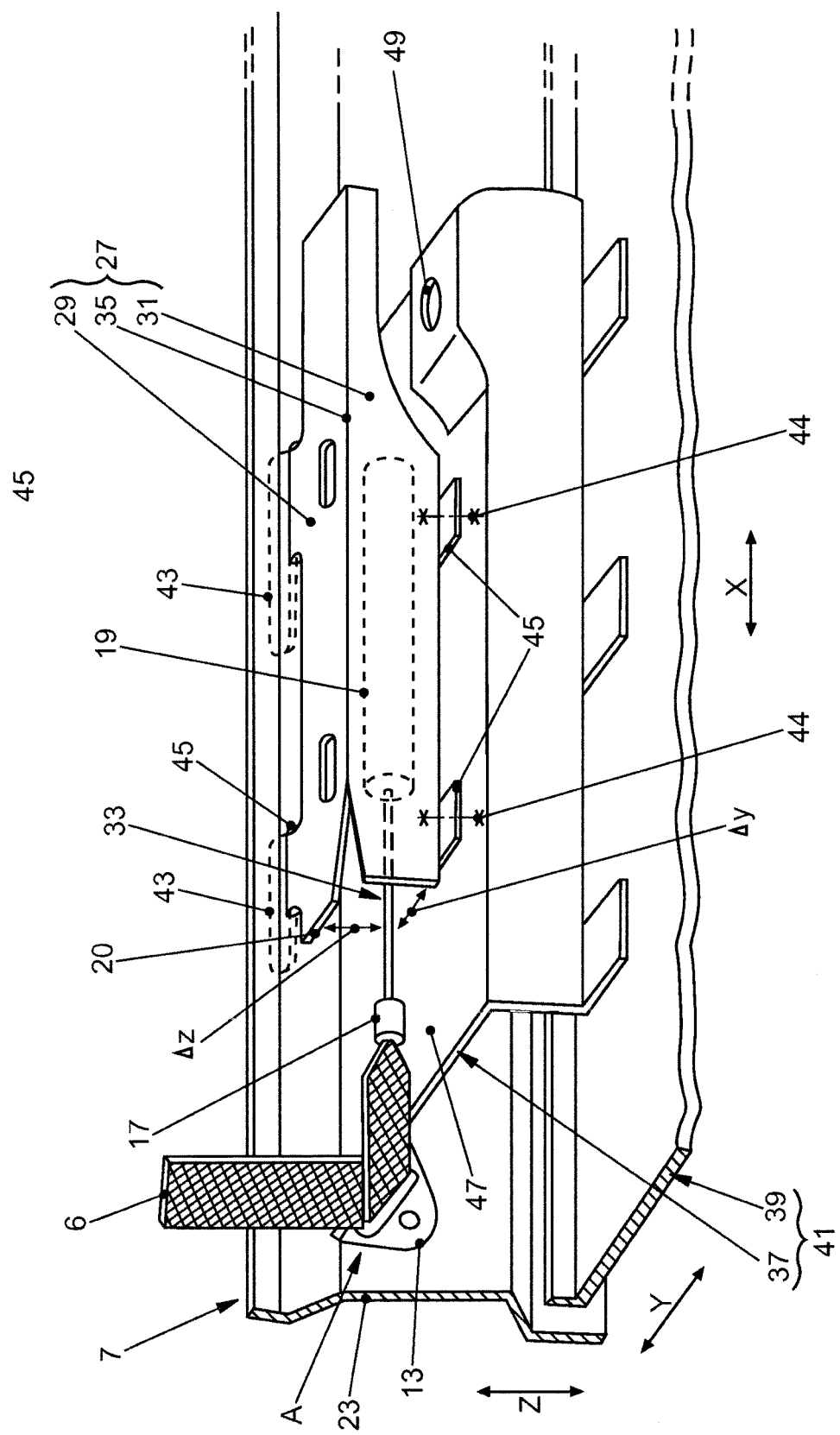

The post-assembly position of seat-belt tensioning device 19 is shown with reference to the subsequent FIGS. 3 and 4. In the present exemplary embodiment, seat-belt tensioning device 19 is a pyrotechnically operable piston-cylinder unit which, in response to activation, exerts the tensile force already mentioned above on lap-belt portion 6. It is provided in the area of doorsill 7.

In accordance with FIG. 3, doorsill 7 is a hollow profile section which lengthens the vehicle side member (not shown) and includes an outer sheet-metal panel 21 that is externally disposed in vehicle transverse direction y, and an inner sheet-metal panel 23 that is inwardly disposed in vehicle transverse direction y, both having a shell-shaped form and being spot-welded to one another via flange joints 25 at the mutually facing edges thereof. Fastened to inner sheet-metal panel 23 of doorsill 7 is a bearing profile section 27, on whose upper side, sill trim strip 4 is configured that covers inner sheet-metal panel 23. In FIG. 3, bearing profile section 27 is configured as an angle section that is elongate in vehicle longitudinal direction x and whose angle legs 29, 31 form bounding walls for an installation space 33 in which seat-belt tensioning device 19 is situated. For this, upper, approximately horizontally configured bounding wall 29 in FIG. 3 is spaced by a height offset Δz from a subjacent floor assembly 41 of the vehicle, while approximately vertically oriented bounding wall 31 is spaced in vehicle transverse direction y by a transverse offset Δy from inner sheet-metal panel 23 of doorsill 7. The two bounding walls 29, 31 merge into one another at a transition edge 35 and are fastened at the free ends thereof to doorsill 7 and to a seat base sheet-metal panel 37, respectively. Together with floor panel 39 and other sheet-metal panels (not shown here), seat base sheet-metal panel 37 forms a floor assembly 41 of the vehicle.

To fasten profiled retaining section 27 in the correct position, retaining tabs 43 are integrally formed on horizontal bounding wall 29 thereof. These engage behind the edge region of corresponding recesses 45 (FIG. 4) in inner sheet-metal panel 23 in the post-assembly position illustrated in FIGS. 3 and 4. To secure this positive engagement, vertical bounding wall 31 is provided toward the bottom with two angled threaded brackets 45 that are bolted via schematically indicated bolt connections 44 to a horizontal mounting face 47 of seat base sheet-metal panel 37. Accordingly, horizontal mounting face 47 forms a lower boundary of installation space 33 for seat-belt tensioning device 19.

Also provided on horizontal mounting face 47 of seat base sheet-metal panels 37 are bolt-attachment points 49 that are adapted for bolting on a vehicle seat (not shown).

As is also inferable from FIG. 3, sill trim strip 7 is fixedly attached via a separate connector 49 to horizontal bounding wall 29 of supporting profile section 27. Moreover, at end thereof that is outwardly disposed in vehicle transverse direction y, sill trim strip 7 is attached via a door sealing profile 51 at upper flange joint 25 of doorsill 7. An installation channel 53 is thereby obtained that is elongate in vehicle longitudinal direction x between the bottom side of sill trim strip 7 and the top side of horizontal bounding wall 29, in which a schematically indicated vehicle wiring harness 55 is installed.

At the end that is inwardly extending in vehicle transverse direction y, sill trim strip 7 merges into a downwardly projecting retaining segment 57 in accordance with FIG. 3. Retaining segment 57 extends around transition edge 35, as well as around vertical bounding wall 31 of profiled retaining section 27 at a distance a, forming a groove. A downwardly open insertion gap 59 is thereby obtained in vertical vehicle direction z within which the edge of a floor covering 61 is clamped. For this, the edge of floor covering 61 is pulled up laterally and brought into contact with inner side 46 of vertical bounding wall 31 of profiled retaining section 27. Moreover, floor covering 61 is located above an only schematically indicated insulation component 63 on floor assembly 41 of the vehicle.

As also can be inferred from FIG. 3, seat-belt tensioning device 19 is bolted via bolt connection 32 (not shown in detail) to vertical, free bounding wall 31 of profiled retaining section 27, and, more specifically, at a predefined joining distance Δf, to inner sheet-metal panel 23 of doorsill 7. This enables seat-belt tensioning device 19 and profiled retaining section 27 to be assembled separately from the automotive body into a preassembly unit and to be subsequently installed in the vehicle bodyshell.

The invention claimed is:

1. A seat-belt configuration for a vehicle comprising a seat belt having
   a shoulder-belt portion,
   a lap-belt portion having an anchorage point (A) disposed towards an outside of the vehicle in a vehicle transverse direction (y), and
   a belt deflector at the anchorage point configured to route the lap-belt portion to a seat-belt tensioning device located in an area of a doorsill,
wherein the doorsill has a profiled retaining section bearing a sill trim strip enclosing an entry area,
wherein the profiled retaining section delimits the installation space for the seat-belt tensioning device by a vertical bounding wall, which is spaced away from the doorsill by a transverse offset (Δy), and by a horizontal bounding wall that is spaced away from the floor assembly by a height offset (Δz),
wherein, at an inner side thereof, the vertical bounding wall in the vehicle transverse direction (y) has a contact face for a floor covering of the floor assembly,
wherein a sill trim strip merges inwardly in the vehicle transverse direction (y) into a retaining segment that extends around a transition edge and the vertical bounding wall at a distance (a), thereby forming an insertion groove into which is placed an edge of the floor covering, and
wherein the seat belt tensioning device is located in an installation space formed between the profiled retaining section and a subjacent vehicle floor assembly of the vehicle.

2. The seat-belt configuration as recited in claim 1, wherein the profiled retaining section is an angular section elongated in a longitudinal direction (x) of the vehicle and comprises a horizontal bounding wall and a vertical bounding wall that converge at a transition edge.

3. The seat-belt configuration as recited in claim 2, wherein the horizontal bounding wall is secured to the doorsill, and/or the vertical bounding wall is secured to the floor assembly.

4. The seat-belt configuration as recited in claim 2, further comprising retaining tabs formed on at least one of the two bounding walls and configured to engage via a form-fitting connection behind the doorsill and/or the floor assembly in a post assembly position of the profiled retaining section and at least one threaded element configured to secure the form-fitting connection via bolting the other bounding wall to the doorsill and/or to the floor assembly.

5. The seat-belt configuration as recited in claim 1, wherein the belt deflector is located in a base region of a vehicle pillar, and the seat-belt tensioning device is located upstream of the belt deflector in a longitudinal direction (x) of the vehicle, and
wherein the profiled retaining section defines an insertion opening open toward the belt deflector though which the lap-belt portion is brought into engagement with the seat-belt tensioning device.

6. The seat-belt configuration as recited in claim 1, wherein the floor assembly has a seat base sheet-metal panel having a horizontal mounting face facing a passenger compartment configured for installing a vehicle seat, and
wherein the installation space is delimited vertically downward by a seat base panel.

7. The seat-belt configuration as recited in claim 1,
wherein, between the profiled retaining section and the sill trim strip, an installation channel is defined in which is configured for placement of power supply lines of the vehicle.

8. The seat-belt configuration as recited in claim 1,
wherein the profiled retaining section delimits the installation space for the seat-belt tensioning device by the vertical bounding wall, which is spaced away from the doorsill by a transverse offset ($\Delta y$), and by the horizontal bounding wall that is spaced away from the floor assembly by a height offset ($\Delta z$).

9. The seat-belt configuration as recited in claim 8,
wherein the horizontal bounding wall is secured to the doorsill, and/or the vertical bounding wall is secured to the floor assembly.

10. The seat-belt configuration as recited in claim 8,
further comprising retaining tabs formed on at least one of the two bounding walls and configured to engage via a form-fitting connection behind the doorsill and/or the floor assembly in a post assembly position of the profiled retaining section and at least one threaded element configured to secure the form-fitting connection via bolting the other bounding wall to the doorsill and/or to the floor assembly.

11. The seat-belt configuration as recited in claim 8,
wherein, at an inner side thereof, the vertical bounding wall in the vehicle transverse direction (y) has a contact face for a floor covering of the floor assembly.

12. The seat-belt configuration as recited in claim 11,
wherein a sill trim strip merges inwardly in the vehicle transverse direction (y) into a retaining segment that extends around a transition edge and the vertical bounding wall at a distance (a), thereby forming an insertion groove into which is placed an edge of the floor covering.

\* \* \* \* \*